United States Patent Office 3,353,456
Patented Nov. 21, 1967

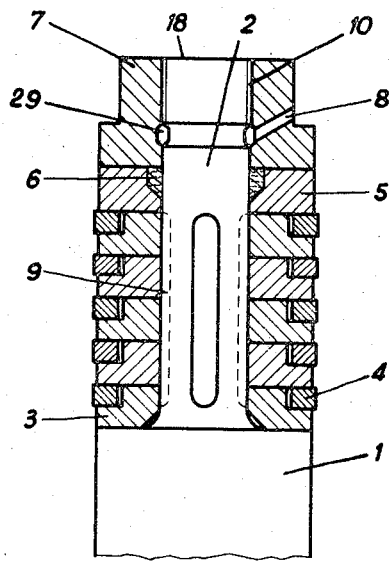
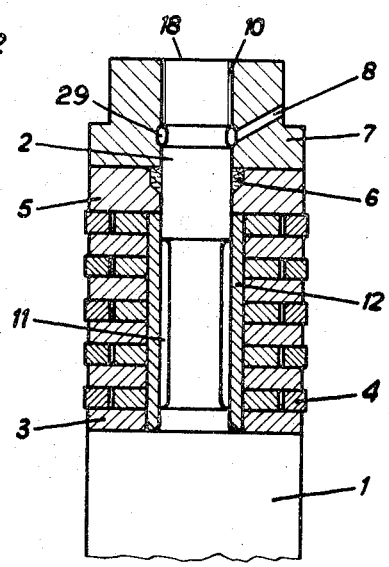

3,353,456
PISTONS FOR VERY HIGH PRESSURE OPERATION IN PUMPS OR COMPRESSORS
Helmut Bauer, Basel, Switzerland, assignor to Maschinenfabrik Burckhardt A.G., Basel, Switzerland, a corporation of Switzerland
Filed Sept. 16, 1965, Ser. No. 487,692
Claims priority, application Switzerland, Sept. 23, 1964, 12,346/64
11 Claims. (Cl. 92—258)

ABSTRACT OF THE DISCLOSURE

A piston for high pressure operation having a central support member with a plurality of annular body members in superposed relation along the length of the support member to form a cylindrical piston body. Piston rings are located in grooves provided in such cylindrical piston body. A nut and a threaded end upon the center support member hold the annular body members together. The dimensions and modulus of elasticity of the material of the piston body relative to the dimensions and modulus of elasticity of the support member are such that said body and support member contract to substantially the same extent in response to operational pressures acting upon their exposed end faces whereby alternating stresses at said nut and threaded end of the support member during operation of the piston are substantially avoided.

Figure 3:
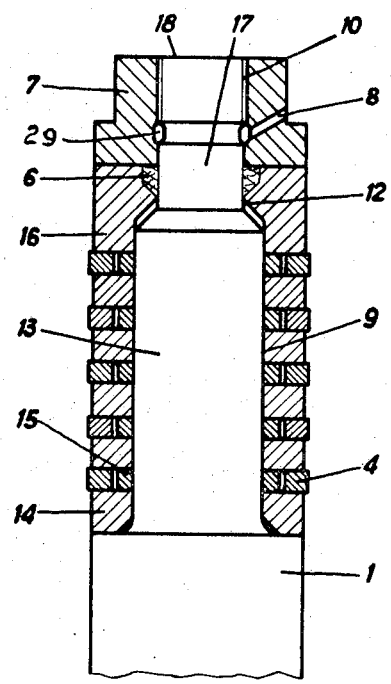

The present invention relates to pistons for very high pressure operation in pump or compressors. The pistons of compressors and pumps for very high pressures cannot be made in one piece. In the high pressure range the diameter of the piston in general is so small that stretching of the piston rings over the body of the piston is no longer possible. In such cases it is generally usual to set the piston rings in grooves formed by a plurality of superposed annular members which are centres on a central support member or shaft formed by a reduced diameter portion of the piston rod and held together by a nut screwed on the end of the shaft.

Experience with such built-up pistons has shown that with high working pressures the threads for receiving the securing nut are exposed to great danger of fatigue fracture. This danger is particularly high if a closed cap nut is used which dams the entry of gas pressure. The gas pressure acting on the end of the piston presses the annular members together and thus reduces their original axial length so that the prestress of the shaft is reduced. As during operation of the compressor at each revolution the gas pressure alternates between suction and compression pressure, the elastic compression of the superposed annular members varies in corresponding measure which causes a considerable alternation in stress in the securing threads. Even if an open nut which admits gas pressure to the thread is used such alternating stresses are normally present.

The fatigue fractures by such alternating stresses are extremely dangerous, especially in pistons, and can lead to the destruction of the compressor, particularly if a broken off securing nut takes an unsuitable position within the compression chamber.

An object of the invention is the construction of a built-up piston in which alternating stresses are to a great extent avoided so that the risk of fatigue fractures is substantially reduced.

According to the invention there is provided a piston for very high pressure operation comprising a central support member, a plurality of annular body members assembled in superposed relation along the length of said support member to form a cylindrical piston body of which the diameter is stepped at intervals along its axial length so as to define at least one piston ring receiving groove, at least one piston ring positioned in said groove and threaded means holding said annular body members together on said support member, the dimensions and modulus of elasticity of the material of said piston body in relation to the dimensions and modulus of elasticity of said support member being such that said body and support member contract to substantially the same extent in response to operational pressures acting upon their exposed end faces whereby alternating stresses between said nut and threaded end of said support member during operation of the piston are substantially avoided.

Figure 4:
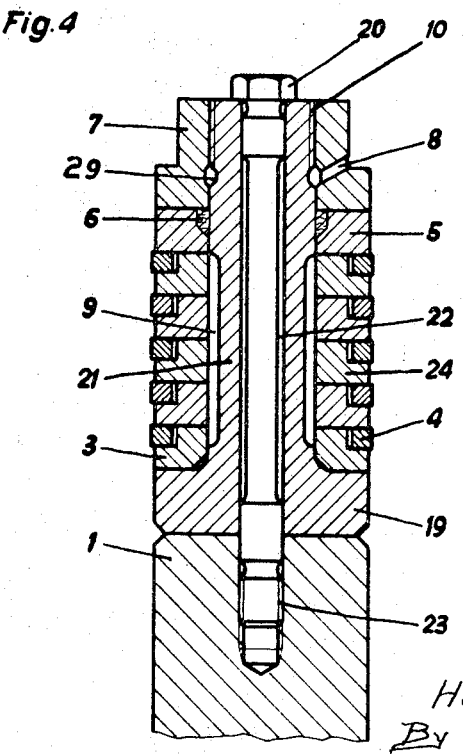

With the above and other objects in view which will become apparent from the detailed description below, some preferred embodiments of the invention are shown in the drawings in which:

FIGURE 1 is a cross-sectional view of a piston rod showing one form of the invention.
FIGURE 2 is a similar view showing a modification.
FIGURE 3 is a similar view showing a further modification, and
FIGURE 4 is a similar view showing a still further modification.

In FIGURE 1 the central support member or shaft 2, constituted by a reduced diameter part of the piston rod 1, receives a number of annular members or chamber rings 3 and an end ring 5. In the chambers or grooves of the rings 3 (which can also be formed in two parts, namely a support ring and spacing ring of different diameter) piston rings 4 of usual construction are received. Above the superposed rings 3 there is an end ring 5 in which a packing ring 6 is located which hinders the passage of gas along the shaft 2. The single or multi-part chamber rings 3 are ground gas tight on the end surfaces. The set of chamber rings and end ring 5 are held together by an open nut 7 screwing on the shaft. In the nut 7 is a bore 8 which equalises the pressure in an annular chamber 29 below the threads 10.

By the provision of the packing 6, known in itself, the end ring 5, and chamber rings 3 are only loaded on the surfaces to the gas pressure, the whole set of rings elastically shortening under the effect of the loading. The end surface of the shaft 2 is also under the action of the gas pressure so that the shaft 2 also shortens elastically under the influence of this force. This shortening of the shaft is however not equal to the shortening of the set of rings if the shaft 2, as is generally usual, is of full cross section. If the chamber rings and the shaft 2 are made of material of the same modulus of elasticity, e.g. of steel, the shortening of the set of rings is greater than the shortening of the shaft 2 because the cross section of the rings 3 is reduced by the shouldering to receive the piston rings 4. This difference in shortening leads to the above mentioned alternating stressing of the threads 10. The difference in shortening increases to a still greater value if the chamber rings 3 are made of material of lower modulus of elasticity than the rod, for example of cast iron. In this case the shortening of the set of rings is substantially greater than the shortening of the shaft 2 resulting in a very high stress alternation in the threads 10.

In accordance with the invention this difference in shortening is reduced or avoided, in this example, by a reduction of the section of the shaft 2 by a series of grooves 9 distributed round the periphery. The reduction in cross section of the shaft 2 by the grooves 9 is calculated so that the shortening under the action of the gas pressure acting on the end surface is exactly equal to the shortening of the set of rings. By this measure the harmful alternation of stress in the threads 10 is substantially eliminated.

The grooves 9, made to decrease the cross section of the shaft 2, can have any convenient form. They can be rectangular or half round in section, or take the form of flats, a gradual transition to the full shaft cross section at the ends being advisable.

The necessary reduction in cross section of the shaft 2 in accordance with the invention can also be achieved by a bore.

It is also possible however to reduce the diameter of the shaft 2 over a certain part of its length as indicated at 11, FIGURE 2, in which case a separate centring bush 12 for centring the chamber rings 3 is provided over the shaft.

For very high presures in many cases the chamber rings are made in two pieces of a very hard material with a high modulus of elasticity which deforms less under the loads arising and thus enures a lasting flat surface supporting the piston rings in operation. The high modulus of elasticity makes a somewhat different construction of the piston necessary which is diagrammatically illustrated in FIGURE 3.

In this figure the part 13 of the shaft serves to receive and centre the supporting rings 14 and spacing rings 15, which together constitute the chamber rings the piston rings 4 being received between the supporting rings 14. The termination of the set of rings is formed by an end ring 16 with a packing 6, but the part 17 of the shaft at the location of the packing 6 is of smaller cross section than the remaining part 13 of the shaft. As before, the whole set of rings is held together by a nut 7 provided with the equalising bore 8 and chamber 29.

By the provision of the packing 6, as before the end ring 16 is loaded on its end exposed to the gas pressure and transmits a longitudinal force to the smaller ring cross section of the spacing rings 15 and the supporting rings 14. A compression stress therefore arises in these rings which is greater than that of the gas pressure and the elastic compression of these rings made of a material of high modulus of elasticity is increased. On the end surface 18 the gas pressure acts on a surface corresponding to the diameter of the part 17 of the shaft. As the diameter of the part 13 of the shaft is greater than the diameter of the part 17 a compression stress arises in the shaft 13 which is less than the gas pressure so that the elastic shortening of the shaft 13 under the gas pressure is reduced. Suitable dimensions for the diameters of the shaft parts 13 and 17 can easily be calculated so that even with a material of high modulus of elasticity for the support rings 14 and the spacing rings 15, the total elastic shortening of the set of rings and that of the shaft part 13 remains the same, whereby alternation of stress in the threads 10 is substantially eliminated.

In FIGURES 1 to 3 pistons are shown in which the central support member is in one piece with the piston rod. It is however possible to separate the central support member from the piston rod while still embodying the invention, and an example of this construction is diagrammatically illustrated in FIGURE 4.

In this figure it is assumed, as in FIGURE 1, that the chamber rings 3 and the separately constructed central screw 19 are made of material of the same elastic modulus. The hollow central screw 19 serving to receive the chamber rings and piston rings is releasably attached to the piston rod 1 by a through bolt 20.

By the provision of suitable grooves 9 in the periphery of the shaft 21 the result is again that the total shortening of the set of rings is equal to the shortening of the central screw 19 so that no alternating stresses arise in the threads 10 of the nut 7. The securing bolt 20 is provided at the upper end with a suitable packing under its head.

The bolt 20 itself is loaded on its end surface by the gas pressure and shortens elastically. By suitable reduction of the diameter of the bolt shank 22 over part of its length the result can be obtained that the shortening of the bolt 20 under gas pressure is made equal to the shortening of the central screw 19 so that no alternating stresses arise in the thread 23 of the bolt 20. Instead of grooves 9, a reduction of diameter similar to that of FIGURE 3 can be used in the arrangement of FIGURE 4.

Obviously a construction according to FIGURE 3 using support and spacing rings of a material of high modulus of elasticity can be constructed similarly to FIGURE 4 parts 13 and 17 being hollow and releasably secured to the end of the piston rod 1 by a screw similar to the screw 20 in FIGURE 4.

What I claim:

1. A piston for very high pressure operation comprising a central support member, a plurality of annular body members assembled in superposed relation along the length of said support member to form a cylindrical piston body of which the diameter is stepped at intervals along its axial length so as to define at least one piston ring receiving groove, at least one piston ring positioned in said groove and threaded means holding said annular body members together on said support member, the dimensions and modulus of elasticity of the material of said piston body in relation to the dimensions and modulus of elasticity of said support member being such that said body and support member contract to substantially the same extent in response to operational pressures acting upon their exposed end faces whereby alternating stresses at said threaded means of said support member during operation of the piston are substantially avoided.

2. A piston as claimed in claim 1 wherein said central support member is constituted by a section of reduced diameter at one end of a piston rod.

3. A piston as claimed in claim 1 wherein said central support member has a bore therethrough and said threaded means is constituted by a bolt passing through said bore and bolting said central support member to one end of a piston rod of larger diameter than said central support member.

4. A piston as claimed in claim 1 wherein at least one of said annular members is of reduced diameter over part of its axial length starting from one end face thereof so as to define said groove in co-operation with the next adjacent annular member of the piston body.

5. A piston as claimed in claim 4 wherein the reduction in diameter of said annular member is balanced by a corresponding reduction in the diameter of said central support member.

6. A piston as claimed in claim 1 wherein said central support member is reduced in cross-sectional area by grooves distributed around the periphery of said support member.

7. A piston as claimed in claim 1 wherein said central support member is reduced in cross-sectional area by a bore extending through said support member.

8. A piston as claimed in claim 1 wherein said central support member is of reduced diameter over a limited section of its length and a centering bush having an axial length greater than said limited section is interposed between said support member and said annular members.

9. A piston as claimed in claim 1 wherein at least one of said annular members is of reduced diameter relative to the annular members next adjacent to it so that the three adjacent annular members between them define said groove.

10. A piston as claimed in claim 10 wherein the annular members are formed of a material of higher modulus of elasticity than that of the material of said support member and the difference is compensated by an increase in the cross section of said support member where said annular members are mounted thereon in relation to the cross section thereof at the end face where the operational pressure is effective.

11. A piston as claimed in claim 3 wherein the reduction in diameter of said piston body at said groove is balanced by a corresponding reduction in diameter of a section of the length of said central support member and also by a corresponding reduction in diameter of a section of the length of said bolt.

References Cited

UNITED STATES PATENTS 2,219,989  10/1940  Gimm _____ 92—221 X

FOREIGN PATENTS 1,180,231  4/1955  France.

EDGAR W. GEOGHEGAN, *Primary Examiner.*

MARTIN P. SCHWADRON, *Examiner.*

G. N. BAUM, *Assistant Examiner.*